Figure 1:
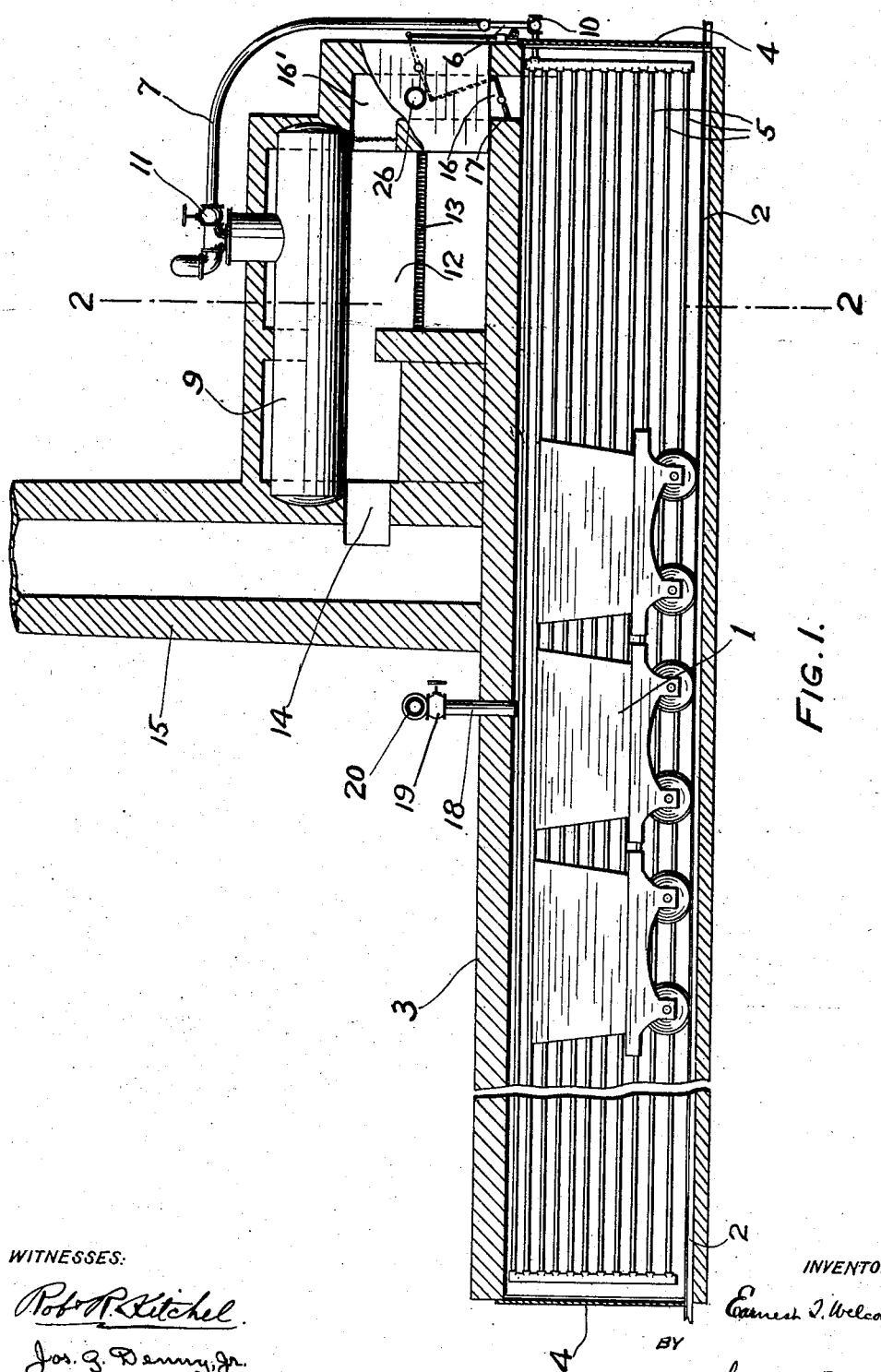

No. 889,418. PATENTED JUNE 2, 1908.
E. T. WELCOME.
APPARATUS FOR TREATING NIGHT SOIL, &c.
APPLICATION FILED SEPT. 12, 1907.

2 SHEETS—SHEET 1.

WITNESSES:
INVENTOR
BY
ATTORNEY.

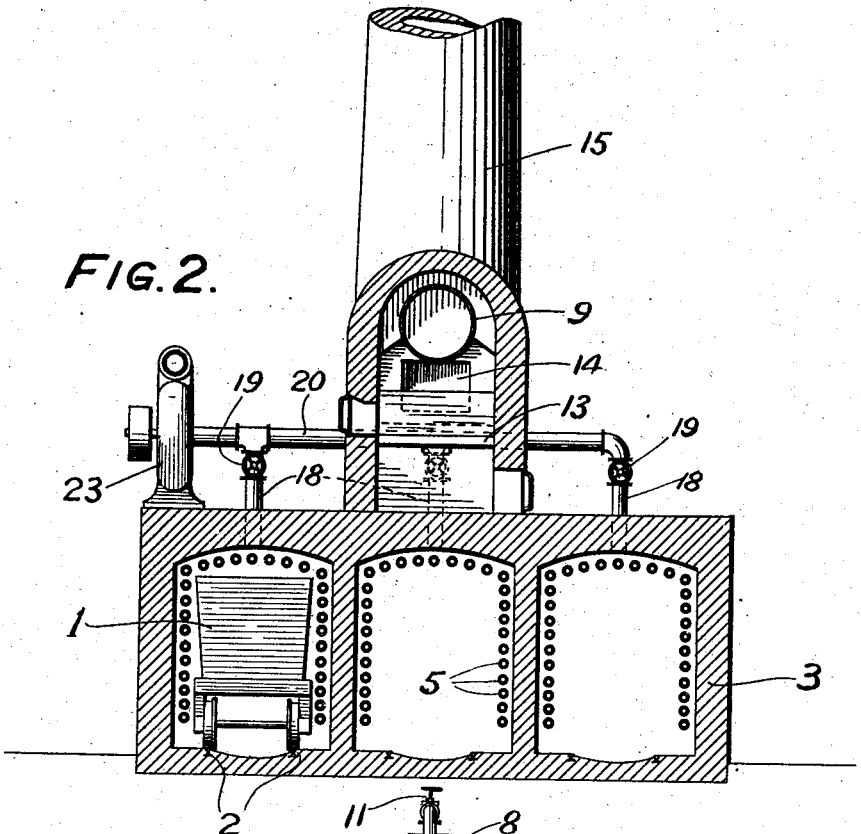
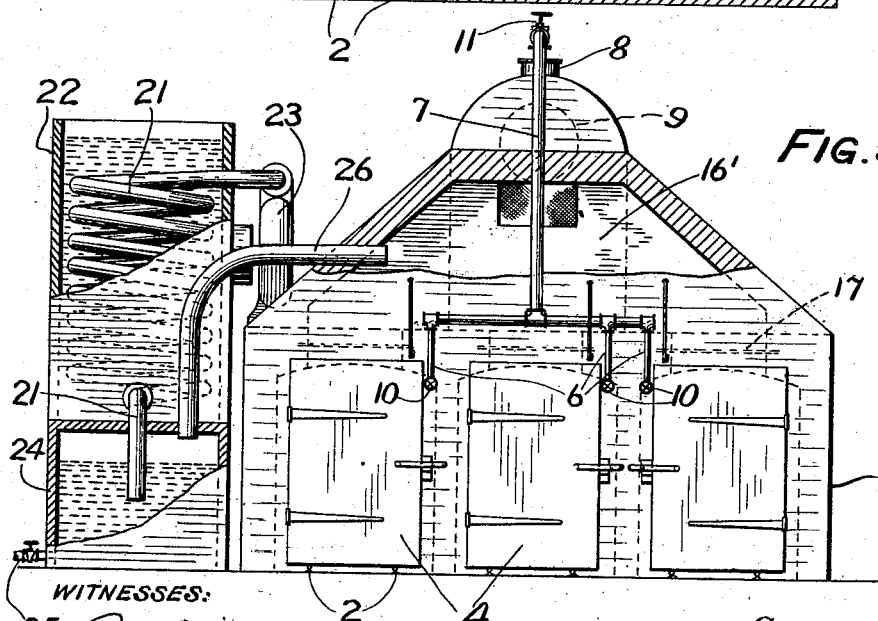

UNITED STATES PATENT OFFICE.

EARNEST T. WELCOME, OF PHILADELPHIA, PENNSYLVANIA.

APPARATUS FOR TREATING NIGHT-SOIL, &c.

No. 889,418.  Specification of Letters Patent.  Patented June 2, 1908.

Application filed September 12, 1907. Serial No. 392,427.

*To all whom it may concern:*

Be it known that I, EARNEST T. WELCOME, a citizen of the United States, residing at Philadelphia, in the county of Philadelphia and State of Pennsylvania, have invented certain Apparatus for Treating Night Soil and Like Materials, of which the following is a specification.

This invention relates to the treatment of materials, such as night soil, to effect their deodorization with the separation of the valuable constituents and the destruction of noxious gases. In its preferred form it comprises means whereby the materials are heated so as to separate the volatile from the solid matter and the volatile matter is passed directly into a furnace, or through a condensing apparatus discharging into a liquid holder having a gas passage discharging into the furnace. The solid matter is thus dried and freed from offensive odors, so that it can be handled and used as a fertilizer or otherwise. The volatile matter may be liquefied to a greater or less extent, with the recovery of valuable matter, as ammonia and oils.

The characteristics of the invention with the means devised for its practice will fully appear by reference to the following description and the accompanying drawings in illustration thereof.

In the drawings, Figure 1 is a vertical longitudinal sectional view of apparatus embodying the invention; Fig. 2 is a vertical sectional view taken on the line 2—2 of Fig. 1, and Fig. 3 is a broken front elevation.

Referring to the drawings, the materials to be treated are loaded in cars 1 which are moved on tracks 2 into ovens 3 having end doors 4, the latter being made to seal the ovens to a greater or less degree as required by the character of the operation. Steam pipes 5 are placed in the ovens and connected by branches 6 with a main 7 leading from the dome 8 of a boiler 9, the branches having the valves 10 and the main having the valve 11 for controlling the passages therethrough. The boiler is heated by a furnace having the combustion chamber 12, containing the grate 13, which is connected by the passage 14 with the stack 15 and by the passages 16 and 16' with the ovens 3, the passages 16 containing the valves 17 by which they may be wholly or partially closed. Branch pipes 18, controlled by valves 19, connect the ovens with a main pipe 20 which discharges through a condenser comprising the coiled pipe 21 in a chamber 22, containing a cooling liquid, a pump 23 connecting the pipes 20 and 21 and exhausting the ovens therethrough. The condensing pipe 21 discharges into the closed vessel 24, which retains liquid matter until withdrawn by the valved passage 25, and discharges gaseous matter through the pipe 26 into the furnace. The volatile matter discharged may be passed through water or other material for absorption of its constituents, as in the vessel 24.

It will now be seen that with the ovens charged and closed the indirect passage therefrom to the furnace by way of the condenser may be closed and the volatile matter discharged directly to the combustion chamber by the connecting passages having their valves open, the draft acting as an exhaust; or the direct passages from the ovens to the combustion chamber may be closed and the volatile matter discharged, aided by the exhausting action of the pump, through the now open passages to the condenser, whence the gaseous matter remaining escapes to the combustion chamber. Means are thus provided for effecting deodorization, separation of the solid and volatile matter, condensation of volatile matter, and combustion of noxious gases, while flexibility in operation is secured so that any volatile matter which it is not desired to subject to the action of the condenser can be burned directly.

It is to be understood that my invention is applicable to the treatment of not only night soil, but also offal and other products containing animal and vegetable matter, with the destruction of germs and the prevention of unsanitary conditions, as well as the recovery of valuable products.

Having described my invention, I claim:—

1. In apparatus of the class described, a drying oven adapted for receiving a car, a furnace, a boiler heated by said furnace and having means for heating said oven, and a conduit or conduits leading from said oven to said furnace.

2. In apparatus of the class described, a drying oven adapted for receiving a car, a furnace, a conduit directly connecting said oven and furnace, and a condenser connected with said oven.

3. In apparatus of the class described, a drying oven adapted for receiving a car, a furnace, a boiler heated by said furnace and having means for heating said oven, a condenser, and a conduit leading from said oven to said condenser.

4. In apparatus of the class described, an oven, a furnace, a condenser, a conduit leading from said oven to said condenser, and an independent direct conduit leading from said oven to said furnace.

5. In apparatus of the class described, an oven, a combustion chamber, a boiler acted upon by the products of combustion in said chamber and having means for heating said oven, a conduit leading from said oven to said combustion chamber, a second conduit leading from said oven to said combustion chamber, and condensing mechanism connected with said second conduit.

6. In apparatus of the class described, an oven, a combustion chamber, a boiler acted upon by the products of combustion in said chamber and having means connected therewith for heating said oven, a valved conduit leading from said oven to said chamber, a second valved conduit leading from said oven to said chamber, and condensing and collecting mechanism connected with said second conduit.

7. In apparatus of the class described, one or more ovens having a track or tracks therein and one or more doors for sealing them, a furnace above said oven or ovens, a conduit or conduits leading from said oven or ovens to said furnace, a boiler heated by said furnace, and a pipe connected with said boiler for heating said oven or ovens.

8. In apparatus of the class described, an oven, a track in said oven, a door for closing said oven, a furnace, a conduit leading from said oven to said furnace, a valve for controlling said conduit, a pipe in said oven, and a boiler connected with said pipe and heated by said furnace.

In testimony whereof I have hereunto set my name this 11th day of September, 1907, in the presence of the subscribing witnesses.

EARNEST T. WELCOME.

Witnesses:
W. H. WRIGHT,
ROBERT JAMES EARLEY.